(12) United States Patent
Park et al.

(10) Patent No.: US 8,913,139 B2
(45) Date of Patent: Dec. 16, 2014

(54) IMAGE STABILIZER AND DIGITAL PHOTOGRAPHING APPARATUS HAVING THE SAME

(71) Applicant: Samsung Electronics Co., Ltd., Suwon-si (KR)

(72) Inventors: Chi-young Park, Suwon-si (KR); Kwang-seok Byon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/770,341

(22) Filed: Feb. 19, 2013

(65) Prior Publication Data
US 2014/0078328 A1 Mar. 20, 2014

(30) Foreign Application Priority Data

Sep. 14, 2012 (KR) .................. 10-2012-0102228

(51) Int. Cl.
*H04N 5/228* (2006.01)
*G03B 17/00* (2006.01)
*H04N 5/232* (2006.01)
*G02B 27/64* (2006.01)

(52) U.S. Cl.
CPC .......... *H04N 5/23287* (2013.01); *G02B 27/646* (2013.01)
USPC ...................................... 348/208.11; 396/55

(58) Field of Classification Search
None
See application file for complete search history.

(56) References Cited

U.S. PATENT DOCUMENTS

| 7,881,597 | B2 * | 2/2011 | Tsutsumi et al. ............... 396/55 |
| 8,125,711 | B2 * | 2/2012 | Kimura ......................... 359/554 |
| 8,432,626 | B2 * | 4/2013 | Park et al. ..................... 359/814 |
| 2008/0055421 | A1 | 3/2008 | Kimura |
| 2010/0195206 | A1 * | 8/2010 | Miyamori et al. ............ 359/557 |
| 2011/0013030 | A1 * | 1/2011 | Lee .......................... 348/208.11 |
| 2011/0181740 | A1 | 7/2011 | Watanabe et al. |
| 2012/0013753 | A1 * | 1/2012 | Kanda ..................... 348/208.11 |
| 2012/0105960 | A1 | 5/2012 | Park et al. |
| 2012/0218635 | A1 | 8/2012 | Suzuka |

FOREIGN PATENT DOCUMENTS

KR 10-2012-0044631 A 5/2012

OTHER PUBLICATIONS

Extended Search Report established for EP 13160320.1 (Dec. 4, 2013).

* cited by examiner

*Primary Examiner* — Luong T Nguyen
(74) *Attorney, Agent, or Firm* — Drinker Biddle & Reath LLP

(57) ABSTRACT

An image stabilizer includes: a correction lens module that comprises a correction lens and a correction lens supporting plate to which the correction lens is coupled; a magnet that is fixed to the correction lens supporting plate; a driving unit that is disposed to face the magnet and reacts to the magnet so as to move the correction lens module in a first direction perpendicular to an optical axis and in a second direction perpendicular to the first direction; a detecting unit that is disposed to face the magnet opposite the driving unit and detects movement of the correction lens module; and a magnetic body that is disposed to face the magnet to restore the correction lens module to an initial position thereof and is placed on a same plane as the detecting unit.

16 Claims, 7 Drawing Sheets

IMAGE STABILIZER AND DIGITAL PHOTOGRAPHING APPARATUS HAVING THE SAME

CROSS-REFERENCE TO RELAYED APPLICATIONS

This application claims the priority benefit under 35 U.S.C. §119(a) from Korean Patent Application No. 10-2012-102228 filed on Sep. 14, 2012 in the Korean Intellectual Property Office, the disclosure of which is incorporated herein by reference in its entirety.

BACKGROUND

1. Field

The present disclosure relates to an image stabilizer and a digital photographing apparatus including the same. More particularly, the present disclosure relates to an image stabilizer for preventing, when photographing, sharpness of an image from being degraded due to hand-shake and a digital photographing apparatus including the same.

2. Description of the Related Art

Recently, as digital photographing apparatuses, such as digital cameras, digital video cameras, etc., become widely prevalent, desires of consumers are increasing gradually to acquire high-quality still images or videos. Particularly, demand for digital photographing apparatuses having an image stabilizer for preventing sharpness of an image from being degraded due to hand-shake of a user is increasing.

Conventional image stabilizers typically move an image correction lens or move an image pickup device to perform an image stabilizing function. The conventional image stabilizer has a driving unit to drive the image correction lens, and the driving unit is driven by a coil and a magnet that can generate an electromagnetic force. Also, the conventional image stabilizer includes a detecting unit that detects the extent the image correction lens or the driving unit moves relative with respect to a base and is arranged in a correction lens supporting plate.

As the digital photographing apparatuses are increasingly miniaturized, the thickness of the conventional image stabilizer needs to be reduced. Corresponding to the miniaturization and thinning of the digital photographing apparatus, the reduction in the thickness of the image stabilizer has been studied.

SUMMARY

The present disclosure has been developed in order to overcome the above drawbacks and other problems associated with the conventional arrangement. An embodiment of the present disclosure is to provide an image stabilizer of which the overall thickness can be reduced since a magnetic body and detecting unit are disposed on a same plane and a digital photographing apparatus having the same.

The above aspect and/or other feature of the present disclosure can substantially be achieved by providing an image stabilizer, which may include a correction lens module that comprises a correction lens and a correction lens supporting plate to which the correction lens is coupled; a magnet that is fixed to the correction lens supporting plate; a driving unit that is disposed to face the magnet and reacts to the magnet so as to move the correction lens module in a first direction perpendicular to an optical axis and in a second direction perpendicular to the first direction; a detecting unit that is disposed to face the magnet opposite the driving unit and detects movement of the correction lens module; and a magnetic body that is disposed to face the magnet to restore the correction lens module to an initial position thereof and is placed on a same plane as the detecting unit.

The magnetic body may be disposed so that a center of the magnetic body coincides with a center of the detecting unit.

The magnetic body may be spaced apart from and surround the detecting unit.

The magnetic body may be formed in one of a circular ring shape, an ellipse ring shape, and a polygon ring shape.

The magnetic body may be formed in a symmetrical shape with respect to the detecting unit.

The driving unit may include at least one first driving unit to move the correction lens module in the first direction and at least one second driving unit to move the correction lens module in the second direction.

The magnet may include a first magnet and a second magnet that, respectively, face the first driving unit and the second driving unit, the detecting unit may include a first detecting unit and a second detecting unit that, respectively, detect movements of the first magnet and the second magnet, the magnetic body may include a first magnetic body and a second magnetic body that are respectively disposed on the same plane as the first detecting unit and the second detecting unit, and the image stabilizer may include a base that supports the correction lens supporting plate to move in the first direction and the second direction.

The first detecting unit and the second detecting unit may each be a hall sensor.

The first driving unit and the second driving unit may each be a coil.

The image stabilizer may include a cover unit that is connected to the base to cover the correction lens supporting plate, wherein the first driving unit and the second driving unit are fixed to a bottom surface of the cover unit.

The first driving unit and the second driving unit may each include a printing coil disposed on the bottom surface of the cover unit.

The driving unit may include a first driving unit and a second driving unit that move the correction lens module in the first direction, and a third driving unit and a fourth driving unit that move the correction lens module in the second direction, the first driving unit and the second driving unit may be disposed so that a first driving force action line, which is exerted on the correction lens module by the first driving unit and the second driving unit, parallel to the first direction and passes through a center of gravity of the correction lens module, the third driving unit and the fourth driving unit may be disposed so that a second driving force action line, which is exerted on the correction lens module by the third driving unit and the fourth driving unit, is parallel to the second direction and passes through the center of gravity of the correction lens module, and the center of gravity of the correction lens module may be disposed in an optical axis passing through the correction lens.

The first, second, third, and fourth driving unit may each be a coil, the magnet may include first, second, third, and fourth magnets to face the first, second, third, and fourth driving units, respectively, the detecting unit may include first, second, third, and fourth detecting units to detect movement of the first, second, third, and fourth magnets, respectively, the magnetic body may include first, second, third, and fourth magnetic bodies disposed on a same plane as the first, second, third, and fourth detecting units, respectively, and the image stabilizer may include a base that supports the correction lens supporting plate to move in the first direction and the second direction, and in which the first, second, third, and fourth magnetic bodies and the first, second, third, and fourth detecting units are disposed.

According to another embodiment of the present disclosure, a digital photographing apparatus may include a camera body; and an image stabilizer that is disposed in the camera body and as described above.

Other objects, advantages and salient features of the present disclosure will become apparent from the following detailed description, which, taken in conjunction with the annexed drawings, discloses preferred embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of the exemplary embodiments. Further, dimensions of various elements in the accompanying drawings may be arbitrarily increased or decreased for assisting in a comprehensive understanding.

Figure 1:
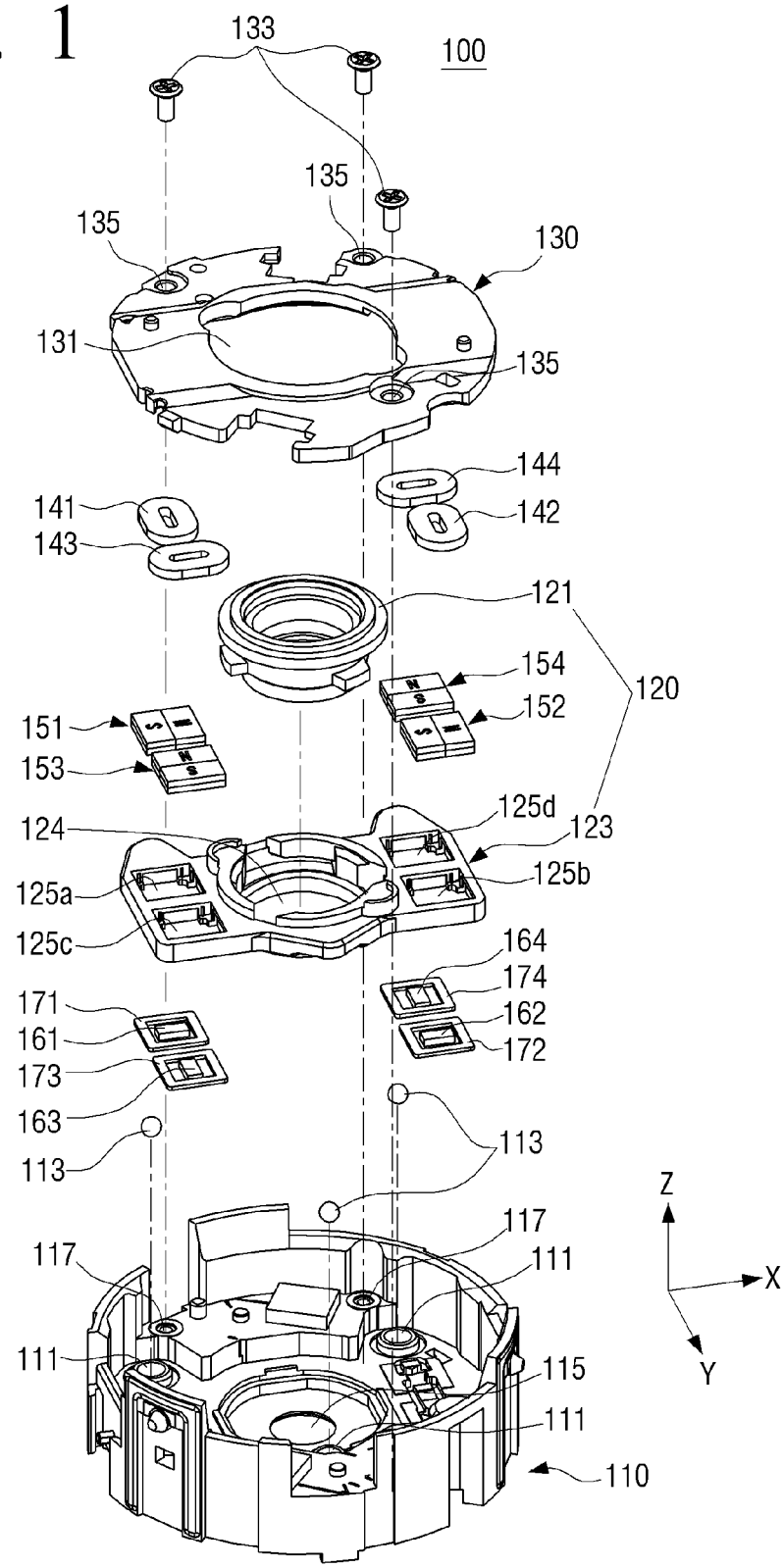
FIG. 1 is an exploded perspective view illustrating an image stabilizer, according to an embodiment of the present disclosure.
Figure 2:
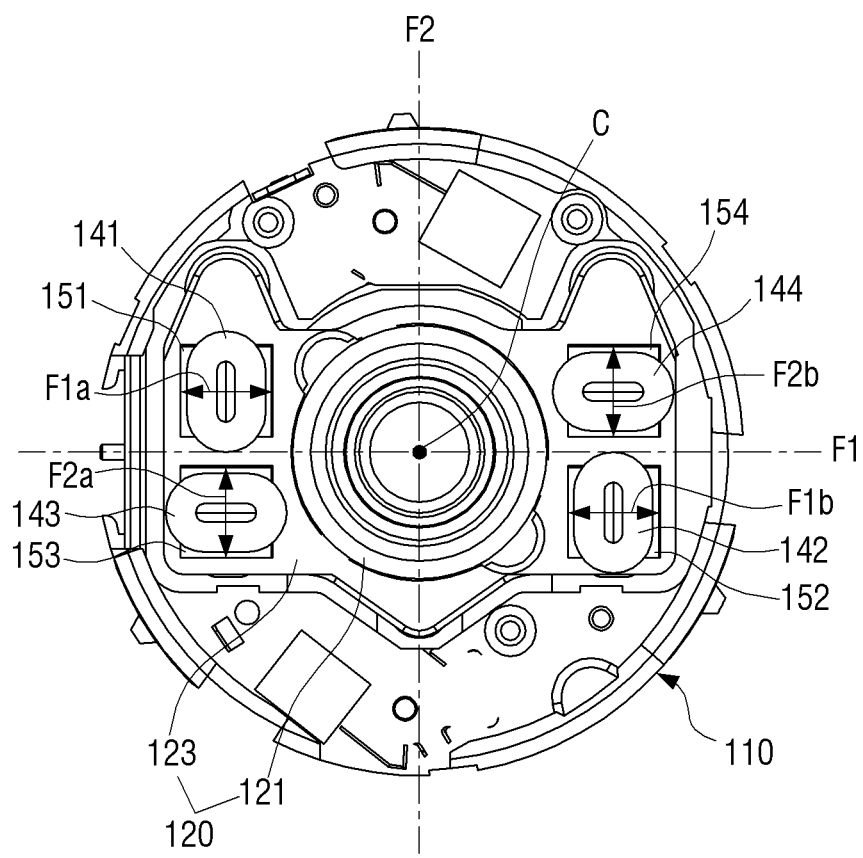
FIG. 2 is a view illustrating an image stabilizer when a cover is removed, according to an embodiment of the present disclosure.

FIG. 1 is an exploded perspective view illustrating an image stabilizer 100, according to an embodiment of the present disclosure, and FIG. 2 is a view illustrating the image stabilizer 100 when a cover 130 is removed.

Referring to FIG. 1, the image stabilizer 100 usable with a digital photographing apparatus according to an embodiment of the present disclosure includes a base 110, a correction lens module 120, a cover unit 130, first to fourth driving units 141, 142, 143, and 144, first and fourth magnets 151, 152, 153, and 154, first to fourth detecting units 161, 162, 163, and 164, and first and fourth magnetic body 171, 172, 173, and 174.

The base 110 supports the correction lens module 120 to move in a first direction (X axis) perpendicular to an optical axis (Z axis) and in a second direction (Y axis) perpendicular to the first direction. A plurality of ball bearings 111 is arranged between the base 110 and the correction lens module 120 so that the correction lens module 120 can slide on the base 110 in the first direction and in the second direction. The plurality of ball bearings 111 is slidably received in a plurality of ball bearing receiving grooves 113 that is arranged at intervals on one surface of the base 110, respectively. Accordingly, the plurality of ball bearings 111 slidably supports a bottom surface of the correction lens module 120 that faces a top surface of the base 110 (preferably, a bottom surface of a correction lens supporting plate 123 as described below). As a result, when hand-shake occurs, the correction lens module 120 moves in the first direction and the second direction to sharpen images from data obtained from an image pickup device (not illustrated), thereby correcting the hand-shake.

Also, a light-pass-through hole 115, through which a light that has passed through a correction lens 121 of the correction lens module 120 can pass, is formed to penetrate the base 110. The light-pass-through hole 115 may be determined to have a position and a size so that maximum distances that the correction lens 121 can move in the first and second directions are considered, and the light passing through the correction lens 121 can pass through the light-pass-through hole 115 in any position within a movement range of the correction lens module 120.

The base 110 may have a pair of shutters (not illustrated) to adjust an amount of incident light when taking a picture by opening and closing the light-pass-through hole 115 and a pair of shutter driving units (not illustrated) to drive the pair of shutters, respectively. In the present embodiment, the base 110 has a pair of shutters and shutter driving units; however, the base 110 is not limited by those. One of the pair of shutters may also be replaced with a neutral density (ND) filter.

The correction lens module 120 includes the correction lens 121 and the correction lens supporting plate 123 to support the correction lens 121. The correction lens module 120 is formed so that the center of gravity thereof is located in the geometric center thereof, and thus, is symmetrical about the geometric center thereof.

An optical axis is located at a center of the correction lens 121, and the center of the correction lens 121 coincides with the center of gravity of the correction lens module 120. A mounting hole 124 in which the correction lens 121 is disposed is formed in an approximate central portion of the correction lens supporting plate 123. A first connection hole 125a and a third connection hole 125c are formed in the left side of the mounting hole 124 of the correction lens supporting plate 123, and a second connection hole 125b and a fourth hole 125d are formed in the right side of the mounting hole 124 of the correction lens supporting plate 123. The first to fourth magnets 151, 152, 153, and 154 are inserted in the first to fourth connection holes 125a, 125b, 125c, and 125d, respectively. At this time, the first and third connection holes 125a and 125c and the second and fourth connection holes 125b and 125d are arranged to be symmetrical with each other with respect to the center of the correction lens 121 so that the first and third magnets 151 and 153 and the second and fourth magnets 152 and 154 are symmetrical with each other with respect to the center of the correction lens 121 as illustrated in FIG. 2.

The cover unit 130 is coupled to the base 110 by a plurality of fastening members 133 to cover the correction lens supporting plate 123. The plurality of fastening members 133 (for example, bolts) passes through a plurality of fastening holes 135 formed in the cover unit 130, and then, is fastened to a plurality of fastening holes 117 of the base 110, respectively. The cover unit 130 is arranged so that a bottom surface thereof is spaced apart a predetermined distance from the top surface of the correction lens supporting plate 123 to make an installation space available for the first to fourth driving units 141, 142, 143, and 144.

Also, the cover unit 130 has a light-pass-through hole 131 that is formed in an approximate center portion thereof to allow an external light to enter the correction lens 121. At this time, the light-pass-through hole 131 of the cover unit 130 may be formed to have a diameter larger than that of the correction lens 121.

Figure 3:
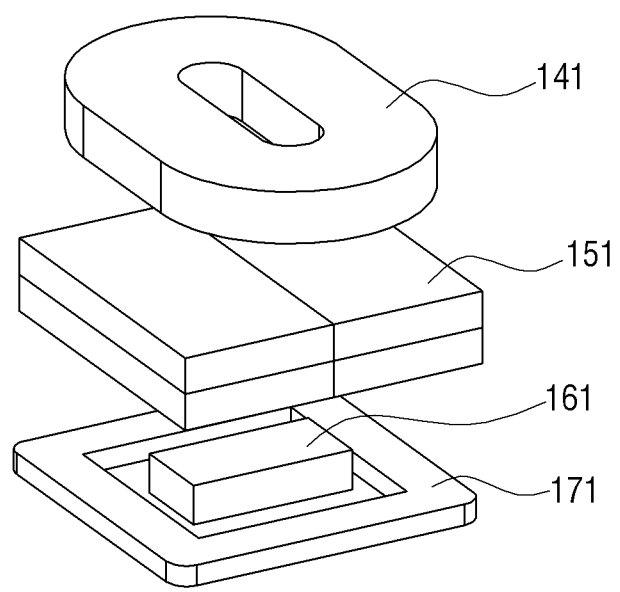
FIG. 3 is a perspective view illustrating an arrangement of a driving unit, a magnet, a detecting unit, and a magnetic body as illustrated in FIG. 1.
Figure 4:
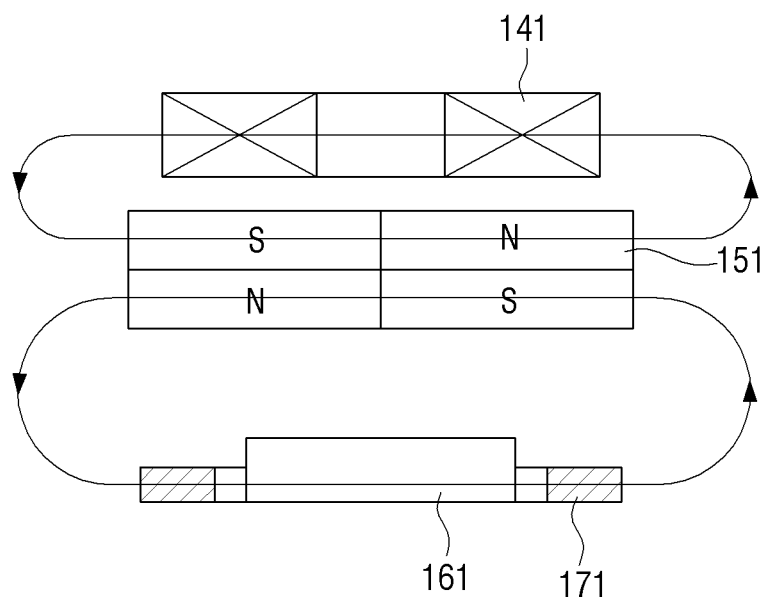
FIG. 4 is a view illustrating magnetic flows between the driving unit and the magnet and between the magnet and the magnetic body as illustrated in FIG. 3.

The first to fourth driving units 141, 142, 143, and 144 cause the correction lens module 120 to move with respect to the base 110 in the first direction and the second direction. The first to fourth driving units 141, 142, 143, and 144 are fixed to a bottom surface of the cover unit 130, and are positioned to face and spaced apart from the first to fourth magnets 151, 152, 153, and 154, respectively. In other words, as illustrated in FIGS. 3 and 4, the first driving unit 141 is spaced apart from the first magnet 151. Similarly, the second to fourth driving units 142, 143, and 144 are spaced apart the same distance from the second to fourth magnets 152, 153, and 154.

At this time, the first to fourth driving units 141, 142, 143, and 144 may be formed as coils that receive external current and generate an electromagnetic force. Accordingly, by generating a desired size of attractive and repulsive forces between the first to fourth driving units 141, 142, 143, and 144 and the first to fourth magnets 151, 152, 153, and 154, the first to fourth driving units 141, 142, 143, and 144 can move the correction lens module 120.

A driving force action line F1 is exerted on the correction lens supporting plate 123 by a first driving force action line F1a that is applied to the correction lens supporting plate 123 by the first driving unit 141 and a second driving force action line F1b that is applied to the correction lens supporting plate 123 by the second driving unit 142. The first and second driving units 141 and 142 are disposed so that the driving force action line F1 exerted on the correction lens supporting plate 123 by the first and second driving units 141 and 142 passes through the center of gravity of the correction lens module 120. At this time, the first driving force action line F1a of the first driving unit 141 and the second driving force action line F1b of the second driving unit 142 may be parallel to each other.

Also, a driving force action line F2 is exerted on the correction lens supporting plate 123 by a third driving force action line F2a that is applied to the correction lens supporting plate 123 by the third driving unit 143 and a fourth driving force action line F2b that is applied to the correction lens supporting plate 123 by the fourth driving unit 144. The third and fourth driving units 143 and 144 are disposed so that the driving force action line F2 exerted on the correction lens supporting plate 123 by the third and fourth driving units 143 and 144 passes through the center of gravity of the correction lens module 120. At this time, the third driving force action line F2a of the third driving unit 143 and the fourth driving force action line F2b of the fourth driving unit 144 may be parallel to each other.

Accordingly, as illustrated in FIG. 2, a force center C, a point where the driving force action lines F1 and F2 that are exerted on the correction lens supporting plate 123 by the first to fourth driving units 141, 142, 143, and 144 intersect, may coincide with the center of gravity of the correction lens module 120.

On the other hand, the first to fourth driving units 141, 142, 143, and 144 may be formed as printing coils (not illustrated) that are printed on the bottom surface of the cover unit 130 as an alternative to the previously described coils so as to minimize the thickness thereof. Accordingly, the thickness of the image stabilizer 100 can be reduced, and the thickness of a digital photographing apparatus 300 (see FIG. 7), to which the image stabilizer 100 is applied, also can be reduced so that the digital photographing apparatus 300 can be ultra-thin.

The first to fourth detecting units 161, 162, 163, and 164 are disposed to face the driving units 141, 142, 143, and 144 across the magnets 151, 152, 153, and 154, and are spaced apart a predetermined distance from the first to fourth magnets 151, 152, 153, and 154, respectively. In other words, as illustrated in FIGS. 3 and 4, the first detecting unit 161 is spaced apart from the first magnet 151. Similarly, the second, third, and fourth detecting units 162, 163, and 164 are spaced apart the same distance from the second, third, and fourth magnets 152, 153, and 154, respectively.

Accordingly, in the present embodiment, the first to fourth detecting units 161, 162, 163, and 164 can detect movement of the correction lens module 120 in the first direction (X-axis direction) and the second direction (Y-axis direction). In other words, the first to fourth detecting units 161, 162, 163, and 164 may be disposed on the top surface of the base 110 and may be positioned to face the first to fourth magnets 151, 152, 153, and 154, respectively.

In this case, the first and second detecting units 161 and 162 detect movement of the correction lens supporting plate 123 in the first direction (X-axis direction), and the third and fourth detecting units 163 and 164 detect movement of the correction lens supporting plate 123 in the second direction (Y-axis direction). Each of the first to fourth detecting units 161, 162, 163, and 164 may be formed as a hall sensor that detects change in the size of current or voltage induced depending on the intensity of the magnetic field when a position of each of the first to fourth magnets 151, 152, 153, and 154 with respect to each of the first to fourth detecting units 161, 162, 163, and 164 changes according to movement of the correction lens supporting plate 123. In the image stabilizer 100 according to the present embodiment, the first to fourth detecting units 161, 162, 163, and 164 are not limited by that; therefore, they can be configured of various configurations.

The first to fourth magnetic bodies 171, 172, 173, and 174 are spaced apart from and disposed to face the first to fourth magnets 151, 152, 153, and 154. As a result, the correction lens module 120 can be close to the base 110 and can be restored to an initial position thereof by attractive forces formed between the first to fourth magnetic bodies 171, 172, 173, and 174 and the first to fourth magnets 151, 152, 153, and 154.

In order to reduce the thickness of the image stabilizer 100, the first to fourth magnetic bodies 171, 172, 173, and 174 are placed on the same plane with the first to fourth detecting units 161, 162, 163, and 164. For this, each of the first to fourth magnetic bodies 171, 172, 173, and 174 may be formed in a shape to surround each of the first to fourth detecting units 161, 162, 163, and 164, and, for example, may be formed in one of a circular ring shape, an ellipse ring shape, and a polygon ring shape.

On the other hand, in the initial position of the correction lens module 120, the center of each of the first to fourth detecting units 161, 162, 163, and 164 is positioned at the center of each of the first to fourth magnets 151, 152, 153, and 154. For this, the first to fourth magnetic bodies 171, 172, 173, and 174 may be disposed so that a center of each thereof coincides with the center of each of the first to fourth detecting units 161, 162, 163, and 164. In this case, each of the first to fourth magnetic bodies 171, 172, 173, and 174 may be formed symmetrically with respect to each of the first to fourth detecting units 161, 162, 163, and 164.

Figure 5:
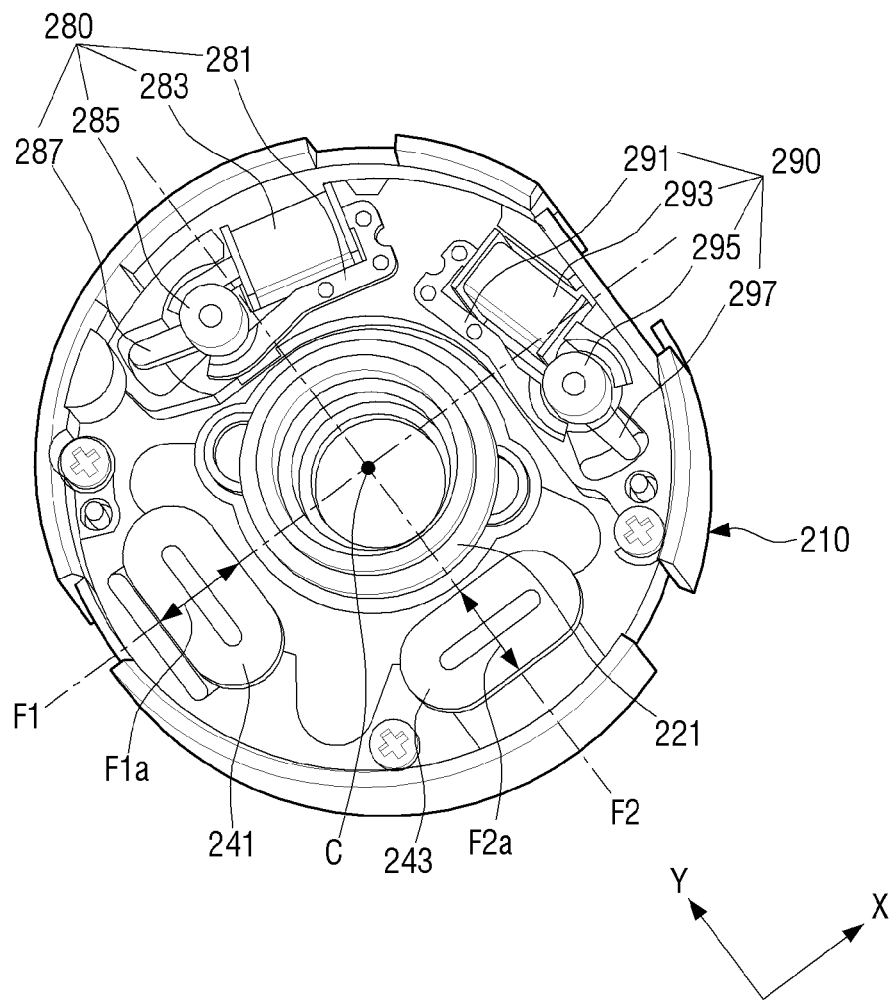
FIG. 5 is a perspective view illustrating an image stabilizer, according to another embodiment of the present disclosure.
Figure 6:
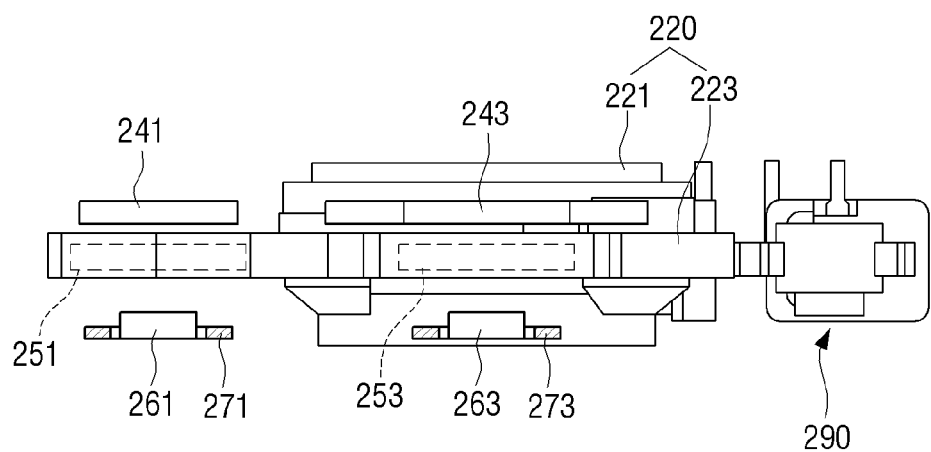
FIG. 6 is a side view illustrating the image stabilizer as illustrated in FIG. 5 when a base thereof is removed.

FIG. 5 is a perspective view illustrating an image stabilizer 200 when a cover unit is removed, according to another embodiment of the present disclosure, and FIG. 6 is a side view illustrating the image stabilizer 200 as illustrated in FIG. 5 when a base is removed. In the below description of the image stabilizer 200, detailed explanations of the same configurations as those of the image stabilizer 100 as described above will be omitted.

The image stabilizer 100 according to an embodiment of the present disclosure as described above includes the four driving units, four magnets, four detecting units, and four magnetic bodies. However, the image stabilizer 200 according to another embodiment of the present disclosure includes two driving units, two magnets, two detecting units, two magnetic bodies, and a pair of shutter driving units disposed on a side thereof.

Referring to FIGS. 5 and 6, the image stabilizer 200 according to another embodiment of the present disclosure includes first and second driving units 241 and 243, first and second magnets 251 and 253, first and second detecting units 261 and 263, and first and second magnetic bodies 271 and 273.

In this case, driving force action lines F1$a$ and F2$a$ of the first and second driving units 241 and 243 are arranged to coincide with the driving force action lines F1 and F2 intersecting at a center C of a correction lens 221 (at this time, the center C of the correction lens 221 is located at an optical axis). Accordingly, a correction lens module 220 can be moved along the driving force action lines F1 and F2 by the first and second driving units 241 and 243. At this time, a correction lens supporting plate 223 can move with respect to a base 210 by ball bearings (not illustrated) like the image stabilizer 100 according to an embodiment of the present disclosure as described above.

On the other hand, the first and second driving units 241 and 243, first and second magnets 251 and 253, first and second detecting units 261 and 263, and first and second magnetic bodies 271 and 273, as illustrated in FIG. 6, are sequentially arranged downwardly from a top side. The arrangement structure thereof is the same as that of the image stabilizer 100 according to an embodiment of the present disclosure as described above.

In the image stabilizer 200, the first and second driving units 241 and 243 are disposed along directions orthogonal to each other, and each of first and second shutter driving units 280 and 290 is disposed opposite each of the first and second driving units 241 and 243 based on the correction lens 221.

The first and second shutter driving units 280 and 290 drive a pair of shutters (not illustrated) disposed a bottom surface of the base 210 to open and close a light-pass-through hole (not illustrated) of the base 210, thereby adjusting an amount of light that passes through the correction lens 221.

Each of the first and second shutter driving units 280 and 290 includes a magnetic body 281 and 291 formed in approximately U-shape, a coil 283 and 293 wound around one side of the magnetic body 281 and 291, and a circular magnet 285 and 295 disposed rotatably between opposite ends of the magnetic body 281 and 291. At this time, an operating lever 287 and 297 may be coupled to the circular magnet 285 and 295 to drive each of the pair of shutters (not illustrated) by interlocking with rotation of the circular magnet 285 and 295 in the clockwise direction and counterclockwise direction.

Figure 7:
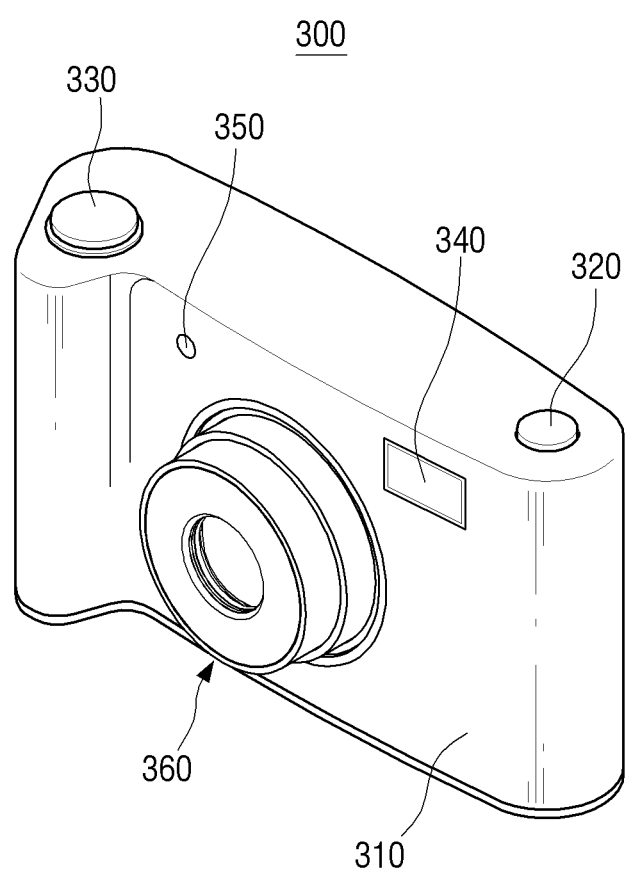
FIG. 7 is a perspective view illustrating a digital photographing apparatus including an image stabilizer, according to an embodiment of the present disclosure.

FIG. 7 is a perspective view illustrating a digital photographing apparatus 300 including an image stabilizer, according to an embodiment of the present disclosure.

Referring to FIG. 7, a digital camera as the digital photographing apparatus 300 according to an embodiment of the present disclosure includes a power switch 320 that is disposed on a side of a top portion of a camera body 310, and a shutter release button 330 that is disposed on the other side of the top portion. Also, a flash 340 and a flash-light amount sensor 350 are disposed in an upper portion of a front surface of the camera body 310. A lens unit 360 capable of zoom operation is disposed in the center of the front surface of the camera body 310. A viewfinder (not illustrated) may be disposed in a rear surface of the camera body 310.

Also, the camera body 310 may have a self-timer lamp (not illustrated). In a self-timer mode, the self-timer lamp operates during a setting time from when the shutter release button 330 is pressed to when the capture of an image starts. When the flash 340 is operated, the flash-light amount sensor 350 detects an amount of the light of the flash 340, and inputs it into a digital camera processor (not illustrated) via a micro controller (not illustrated).

The digital camera may include an image stabilizer according to embodiments as described above and variants thereof.

Accordingly, the present disclosure can prevent the degradation of the sharpness of the image due to the shaking of a camera generated by hand-shake of a user, etc. Particularly, unlike conventional image stabilizers, an image stabilizer according to the present disclosure can effectively prevent the degradation of the sharpness of the image while the image stabilizer is operating.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An image stabilizer comprising:
    a correction lens module that comprises a correction lens and a correction lens supporting plate to which the correction lens is coupled;
    a magnet that is fixed to the correction lens supporting plate;
    a driving unit that is disposed to face the magnet and reacts to the magnet so as to move the correction lens module in a first direction perpendicular to an optical axis and in a second direction perpendicular to the first direction;
    a detecting unit that is disposed to face the magnet opposite the driving unit and detects movement of the correction lens module; and
    a magnetic body that is disposed to face the magnet to restore the correction lens module to an initial position thereof and is placed on a same plane with the detecting unit.

2. The image stabilizer of claim 1, wherein the magnetic body is disposed so that a center of the magnetic body coincides with a center of the detecting unit.

3. The image stabilizer of claim 2, wherein the magnetic body is spaced apart from and surrounds the detecting unit.

4. The image stabilizer of claim 3, wherein the magnetic body is formed in one of a circular ring shape, an ellipse ring shape, and a polygon ring shape.

5. The image stabilizer of claim 1, wherein the magnetic body is formed in a symmetrical shape based on the detecting unit.

6. The image stabilizer of claim 1, wherein the driving unit comprises:
    at least one first driving unit to move the correction lens module in the first direction; and
    at least one second driving unit to move the correction lens module in the second direction.

7. The image stabilizer of claim 6, wherein:
    the magnet comprises a first magnet and a second magnet that, respectively, face the first driving unit and the second driving unit,
    the detecting unit comprises a first detecting unit and a second detecting unit that, respectively, detect movements of the first magnet and the second magnet,
    the magnetic body comprises a first magnetic body and a second magnetic body that are respectively disposed on the same plane as the first detecting unit and the second detecting unit, and
    the image stabilizer further comprises a base that supports the correction lens supporting plate to move in the first direction and the second direction.

8. The image stabilizer of claim 7, wherein the first detecting unit and the second detecting unit each comprises a hall sensor.

9. The image stabilizer of claim 7, wherein the first driving unit and the second driving unit each comprises a coil.

10. The image stabilizer of claim 7, further comprising:
a cover unit that is connected to the base to cover the correction lens supporting plate,
wherein the first driving unit and the second driving unit are fixed to a bottom surface of the cover unit.

11. The image stabilizer of claim 10, wherein the first driving unit and the second driving unit each comprises a printing coil disposed on the bottom surface of the cover unit.

12. The image stabilizer of claim 1, wherein:
the driving unit comprises a first driving unit and a second driving unit that move the correction lens module in the first direction, and a third driving unit and a fourth driving unit that move the correction lens module in the second direction,
the first driving unit and the second driving unit are disposed so that a first driving force action line, which is exerted on the correction lens module by the first driving unit and the second driving unit, is parallel to the first direction and passes through a center of gravity of the correction lens module,
the third driving unit and the fourth driving unit are disposed so that a second driving force action line, which is exerted on the correction lens module by the third driving unit and the fourth driving unit, is parallel to the second direction and passes through the center of gravity of the correction lens module, and
the center of gravity of the correction lens module is disposed in an optical axis passing through the correction lens.

13. The image stabilizer of claim 12, wherein:
the first, second, third, and fourth driving unit each comprises a coil,
the magnet comprises first, second, third, and fourth magnets that face the first, second, third, and fourth driving units, respectively,
the detecting unit comprises first, second, third, and fourth detecting units that detect movement of the first, second, third, and fourth magnets, respectively,
the magnetic body comprises first, second, third, and fourth magnetic bodies disposed on a same plane as the first, second, third, and fourth detecting units, respectively, and
the image stabilizer further comprises a base that supports the correction lens supporting plate to move in the first direction and the second direction, and in which the first, second, third, and fourth magnetic bodies and the first, second, third, and fourth detecting units are disposed.

14. The image stabilizer of claim 13, further comprising:
a cover unit that is connected to the base to cover the correction lens supporting plate,
wherein the first, second, third, and fourth driving units each comprises a printing coil disposed on a bottom surface of the cover unit.

15. The image stabilizer of claim 13, wherein the first, second, third, and fourth detecting unit each comprises a hall sensor.

16. A digital photographing apparatus comprising:
a camera body; and
an image stabilizer disposed in the camera body, wherein the image stabilizer comprises:
a correction lens module that comprises a correction lens and a correction lens supporting plate to which the correction lens is coupled;
a magnet that is fixed to the correction lens supporting plate;
a driving unit that is disposed to face the magnet and reacts to the magnet so as to move the correction lens module in a first direction perpendicular to an optical axis and in a second direction perpendicular to the first direction;
a detecting unit that is disposed to face the magnet opposite the driving unit and detects movement of the correction lens module; and
a magnetic body that is disposed to face the magnet to restore the correction lens module to an initial position thereof and is placed on a same plane as the detecting unit.

* * * * *